(12) United States Patent
Eckhardt et al.

(10) Patent No.: US 11,640,331 B2
(45) Date of Patent: May 2, 2023

(54) SECURING PHYSICAL LAYER STARTUP FROM A LOW-POWER STATE

(71) Applicant: Texas Instruments Incorporated, Dallas, TX (US)

(72) Inventors: Ralf Eckhardt, Wiesbaden (DE); Aniruddha Khadye, San Jose, CA (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 0 days.

(21) Appl. No.: 17/389,081

(22) Filed: Jul. 29, 2021

(65) Prior Publication Data

US 2023/0035770 A1 Feb. 2, 2023

(51) Int. Cl.
*G06F 11/10* (2006.01)
*H04L 12/28* (2006.01)
*G06F 11/30* (2006.01)

(52) U.S. Cl.
CPC ...... *G06F 11/1004* (2013.01); *G06F 11/1076* (2013.01); *H04L 12/28* (2013.01)

(58) Field of Classification Search
None
See application file for complete search history.

(56) References Cited

U.S. PATENT DOCUMENTS

| | | | | |
|---|---|---|---|---|
| 4,201,337 A * | 5/1980 | Lewis | ........... | H03M 13/19 714/785 |
| 4,646,304 A * | 2/1987 | Fossati | ........... | G11C 29/88 714/E11.049 |
| 4,766,573 A * | 8/1988 | Takemae | ........... | G06F 11/1008 365/201 |
| 5,848,076 A * | 12/1998 | Yoshimura | ........... | H03M 13/00 714/763 |
| 6,449,683 B1 * | 9/2002 | Silvester | ........... | G06F 1/3225 711/170 |
| 6,757,862 B1 * | 6/2004 | Marianetti, II | ... | H03M 13/2906 714/759 |
| 2002/0048202 A1 * | 4/2002 | Higuchi | ........... | G11C 29/82 714/E11.045 |

(Continued)

*Primary Examiner* — Cynthia Britt
*Assistant Examiner* — Dipakkumar B Gandhi
(74) *Attorney, Agent, or Firm* — Michelle F. Murray; Frank D. Cimino (57) ABSTRACT

Techniques for establishing a network connection via a physical medium after exiting a low-power state. The technique includes receiving circuit configuration information for configuring a circuit for establishing a network connection via a physical medium. The technique also includes determining first redundancy information based on the circuit configuration information. The technique also includes storing the determined first redundancy information and the circuit configuration information. The technique also includes entering, by the circuit, a low-power state, and exiting the low-power state. The technique also includes determining second redundancy information based on the stored circuit configuration information after the circuit has exited the low-power state. The technique also includes comparing the second redundancy information to the first redundancy information. The technique also includes detecting an error based on the comparing. The technique also includes outputting an indication of the detected error.

20 Claims, 3 Drawing Sheets (56) References Cited

U.S. PATENT DOCUMENTS

| | | | |
|---|---|---|---|
| 2002/0114409 A1* | 8/2002 | Shingaki | H04L 25/38 |
| | | | 375/369 |
| 2006/0064563 A1* | 3/2006 | Hobson | G06F 12/0638 |
| | | | 711/E12.083 |
| 2008/0240135 A1* | 10/2008 | Weast | H04W 52/0274 |
| | | | 370/402 |
| 2012/0179933 A1* | 7/2012 | Lo | H04L 1/0045 |
| | | | 714/E11.023 |
| 2016/0179612 A1* | 6/2016 | Jokinen | G06F 13/28 |
| | | | 714/807 |
| 2016/0286492 A1* | 9/2016 | Kliger | H04W 52/0235 |
| 2016/0364345 A1* | 12/2016 | Jeter | G06F 12/023 |

* cited by examiner

SECURING PHYSICAL LAYER STARTUP FROM A LOW-POWER STATE

BACKGROUND

Networking protocols may include multiple network protocol layers, each of which offers a class of functionality. As an example, the open systems interconnect (OSI) model includes seven abstraction layers describing data flow and functionality in a communication system. These layers include functionality from the physical process of placing bits on the transmission medium to interfacing with applications to receive/provide data. A physical (PHY) layer may be the lowest protocol layer. The PHY layer may provide an interface between higher network protocol layers (such as a data link layer, the medium access control (MAC) layer) and the physical transmission medium. The transmission medium may be a wired (e.g., twisted wire pair) or wireless medium through which signals can propagate. Thus, the PHY layer may define the meaning of the raw bits transmitted and received over the physical transmission medium and the PHY layer may translate logical commands from higher protocol layers into data packets transmitted on the physical transmission medium. The PHY layer may be implemented by a circuit such as one or more integrated circuits (ICs) coupled together. One example of a PHY layer is an ethernet PHY implemented on an ethernet chip, which may be found in a network interface controller (NIC).

In an implementation, an ethernet PHY layer interfaces with a sublayer of the data link layer, such as a MAC layer interface. In some implementations, the MAC layer interface may be a media independent interface (MII). The MII frames data received from higher layers for conversion to a corresponding signal for transmission on the physical medium by the ethernet PHY layer. Similarly, when a signal is received from the transmission medium by the ethernet PHY layer, the received signal is translated by the PHY to a set of bits corresponding to the signal. The MII converts the bits received from the ethernet PHY layer into data and pass on this data to the higher layers. The higher layers may further process the data before providing the processed data to an application for use by the application.

SUMMARY

This disclosure relates to a technique for establishing a network connection via a physical medium, the technique including a circuit including a memory. The memory is configured to receive circuit configuration information. The circuit further includes error detection circuitry configured to: determine first redundancy information based on the circuit configuration information. The error detection circuitry is further configured to store the determined first redundancy information in one or more redundancy bits of the memory. The memory is further configured to store the circuit configuration when the circuit is in a low-power state. The error detection circuitry is further configured to determine that the circuit has exited the low-power state. The error detection circuitry is further configured to determine second redundancy information based on the circuit configuration information stored in the memory after the circuit has exited the low-power state. The error detection circuitry is further configured to compare the second redundancy information to the first redundancy information. The error detection circuitry is further configured to detect an error based on the comparing and output an indication of the detected error.

Another aspect of the present disclosure relates to a method, the method including receiving circuit configuration information, the circuit configuration information for configuring a circuit for establishing a network connection via a physical medium. The method further includes determining first redundancy information based on the circuit configuration information. The method further includes storing the determined first redundancy information and the circuit configuration information; entering, by the circuit, a low-power state. The method further includes exiting the low-power state. The method further includes determining second redundancy information based on the stored circuit configuration information after the circuit has exited the low-power state. The method further includes comparing the second redundancy information to the first redundancy information. The method further includes detecting an error based on the comparing and outputting an indication of the detected error.

Another aspect of the present disclosure relates to a networking device, the networking device including a memory configured to receive circuit configuration information. The networking device also includes error detection circuitry configured to determine first redundancy information based on the circuit configuration information. The error detection circuitry is further configured to store the determined first redundancy information in one or more redundancy bits of the memory. The memory is further configured to store the circuit configuration when the circuit is in a low-power state. The error detection circuitry is further configured to determine that the circuit has exited the low-power state. The error detection circuitry is further configured to determine second redundancy information based on the circuit configuration information stored in the memory after the circuit has exited the low-power state. The error detection circuitry is further configured to compare the second redundancy information to the first redundancy information. The error detection circuitry is further configured to detect an error based on the comparing and output an indication of the detected error.

BRIEF DESCRIPTION OF THE DRAWINGS

For a detailed description of various examples, reference will now be made to the accompanying drawings in which.

The same reference numbers or other reference designators are used in the drawings to designate the same or similar (either by function and/or structure) features.

DETAILED DESCRIPTION

Increasingly devices are being connected together via networks. These networked connected devices include PHY layer components for interfacing with a physical transmission medium to help perform this networking. Additionally, there is a desire to reduce the power consumption of networked devices. Techniques to help reduce power consumption of network connected devices include placing some components, such as the PHY layer, of the devices into a reduced power mode when the components are not needed and reducing the size of some components, which allows components to be operated at lower voltages. To help establish and maintain the network connection, the PHY layer may have one or more configuration and/or control settings (hereinafter referred to as "configuration information"). As a part of entering some reduced power states, this configuration information may be stored. As a part of exiting the reduced power states, this configuration information may be restored. As the size of components of the devices are reduced, they may become more susceptible to interference, such as electrostatic discharge (ESD), radiation, etc. Such interference could cause the stored configuration information to be corrupted, potentially causing problems such as errant system behavior when exiting the reduced power state. Techniques for reducing the impact of such interference may be used to help mitigate these issues.

Figure 1:
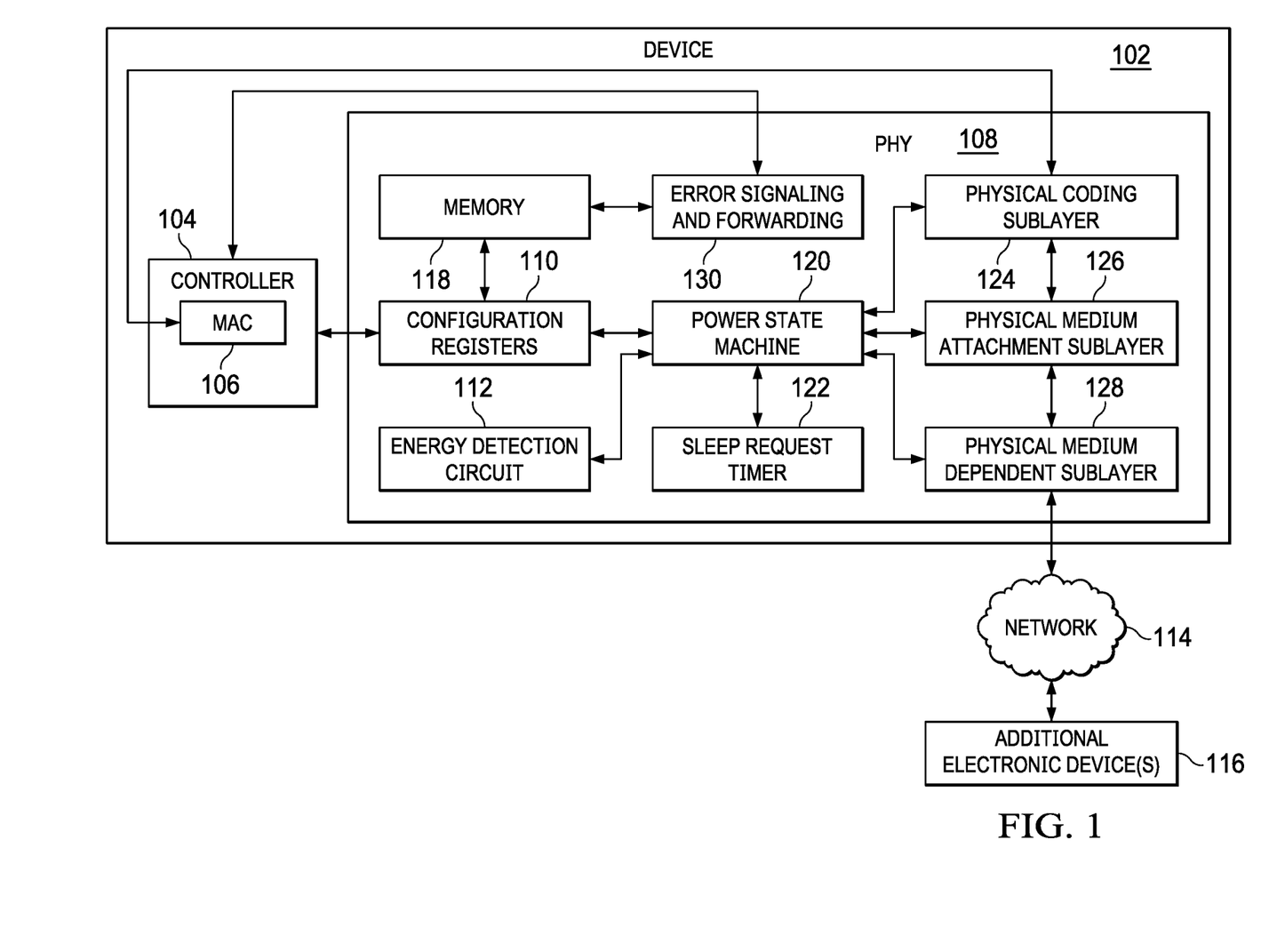
FIG. 1 is a block diagram illustrating a network-connected device and related network topology, in accordance with aspects of the present disclosure

FIG. 1 is a block diagram 100 illustrating a network-connected device and related network topology, in accordance with aspects of the present disclosure. As shown, a network connected device (or simply "device(s)" herein) 102 may include a controller 104 for controlling and interfacing with a network 114 (e.g., a network controller). The controller 104 includes a MAC layer interface 106. The MAC layer interface 106 may encapsulate data from higher level layers into frames for a PHY layer 108 (also called "PHY"), The MAC layer interface 106 is coupled to a physical coding sublayer (PCS) 124 of the PHY layer 108. The PCS 124 helps encode/decode data, for example, by serializing and deserializing data to and from the MAC layer. The PCS 124 is coupled to a physical medium attachment (PMA) sublayer 126. The PMA sublayer 126 helps map coded data bits to signal values for the physical medium. In some cases, the PMA sublayer 126 may also sense channel failures/errors and generate indication of such errors. The PMA sublayer 126 is coupled to a physical medium dependent (PMD) sublayer 128. The PMD sublayer 128 may be configured to provide inputs and receive inputs to and from line drivers and receives, which are coupled to the network 114 via the physical medium. The physical medium may include twisted pair wires, optical fibers, coaxial wires, other types of wired networking mediums or wireless networking mediums.

The controller 104 may be coupled to one or more control and/or configuration registers (hereinafter "configuration registers") 110 of the PHY layer 108. These configuration registers 110 help the controller 104 to interface with and/or control the PHY layer 108. For example, the controller 104 may pass data to the PHY layer 108 by writing to a register of the configuration registers 110 and the PHY layer 108 may pass data to controller 104 by writing data to another register of the configuration registers 110. The data received by the PHY layer 108 may be used to control aspects of the PHY layer 108, for example to control a power mode of the PHY layer 108. In some cases, configuration information stored in the configuration registers may adjust behaviors of the PHY layer 108. The configuration registers 110 may be coupled to a memory 118 (such as DRAMs, SRAMs, EPROMs, FRAM and/or any type of non-transitory memory). The memory 118 may store values of the configuration registers 110, for example, when the PHY 108 is in a lower power state. The memory 118 may be coupled to an error signaling and forwarding module 130. The error signaling and forwarding module 130 may be coupled to the controller 104. The error signaling and forwarding module 130 may be a hardware circuit configured to perform error detection and error forwarding as well as, in some cases, error correction. In some cases, some functionality of the signaling and forwarding module 308 may be integrated as a part of the memory 118. For example, circuitry for error detection and/or error correction may be integrated as a part of the memory.

The configuration registers 110 are also coupled to a power state machine 120, which may be used to control the power states of the PHY layer 108. In some cases, the power state machine 120 may be a microcontroller, processor, application specific integrated circuit, digital logic, software and/or a combination thereof. In this example, the power state machine 120 is coupled to a sleep request timer 116, which may be used to help the PHY layer 108 transition to a sleep state or other lower power state. The PHY layer 108 may be coupled, via a transmission medium (wired or wireless), to the network 114. Other network connected devices 116 may also be coupled to the device 102 via the network 114. In some cases, the PHY layer 108 may be integrated with other components of device 102, for example on the same integrated circuit or chip. For example, the PHY layer 108 may be integrated with the MAC layer interface 106 and/or the controller 104.

Increasingly, devices are being made more energy efficient to help reduce power consumption. As such, low-power modes, such as standby and sleep modes, may be implemented. These low-power modes help reduce power consumption of devices when such devices are not being actively used. In one example, the PHY layer 108 of the device 102 is powered down or at least transitioned to a lower power consumption state when there is no data to transmit or receive by the PHY layer 108. Accordingly, to help reduce power consumption for devices, a PHY layer 108 may be configured to support low-power modes, such as a standby and/or sleep mode. One challenge in implementing low-power modes for the PHY layer 108 includes correctly reloading configuration information when exiting the low-power mode, because correctly reloading the configuration information helps allow the Ethernet PHY to reliably wake up from a low-power mode.

Storing Configuration Information in a Low-Power Mode

Figure 2:
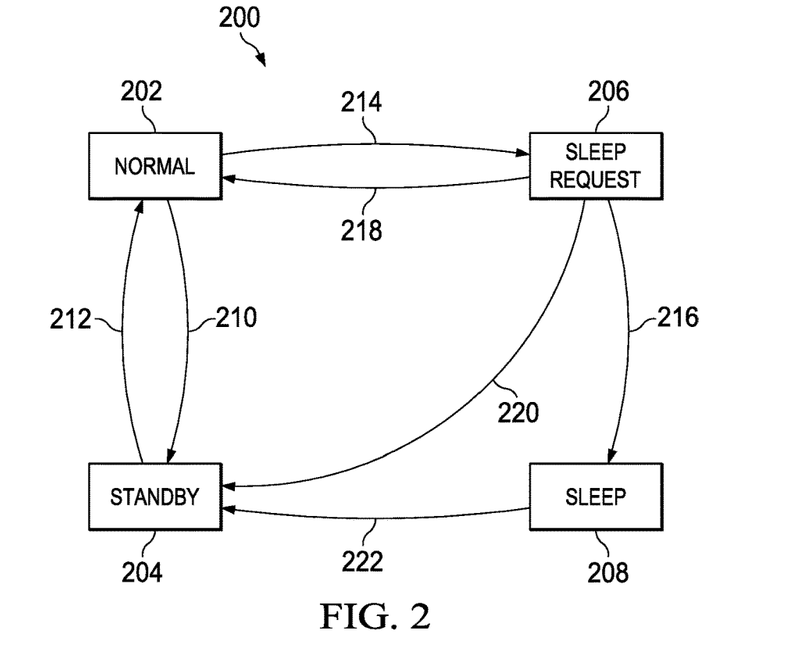
FIG. 2 is a state diagram illustrating low-power states of a PHY layer, in accordance with aspects of the present disclosure.

FIG. 2 is a state diagram 200 illustrating low-power states of the PHY layer 108, in accordance with aspects of the present disclosure. As shown in the example of FIG. 2, the PHY 108 implements four power states—a normal state 202, a standby state 204, a sleep request state 206, and a sleep state 208. After the PHY 108 is powered on and establishes a connection with a network 114, the PHY 108 may initially enter the normal state 202 where a communications link can be established so data may be transmitted and received between the device 102 and another device across the network 114. The PHY 108 may transition from the normal state 202 to the standby state 204 if an indication to enter the standby state 204 is received. In some cases, this indication may be received from the controller 104 via an interface. Examples of this interface may include a hardware pin, a register (e.g., a control register 110), a mapped memory address, etc. For example, the PHY layer may transition 210 from the normal state 202 to the standby state 204 if one or more particular hardware pins are asserted, an undervoltage or overvoltage state is detected on a certain interface and/or one or more hardware pins, one or more bits are set in a control register, and/or a certain amount of time has passed without transmitting or receiving data. In the standby state 204, power consumption by the PHY may be reduced as compared to the normal state 202. The PHY 108 may not be able to establish a communications link and/or transmit and receive data when in the standby state 204, though portions of the PHY may still be active. As an example, in an implementation, the PCS and PMA sublayers of the PHY may be disabled, for example, by powering down the circuits associated with these sublayers by clock gating the circuits, while other components of the PHY may remain operational in the standby state 204. The PHY layer may transition 212 from the standby state 204 back to the normal state 202, for example, if the indication to enter the standby state 204 is removed, for example, by stopping the assertion of one or more hardware pins, removing the undervoltage/overvoltage state, etc.

The sleep request state 206 may be implemented in the PHY layer 108, for example, as an intermediate state for transitioning to the sleep state 208. In some cases, the sleep state 208 may be accessed through the sleep request state 206. For example, the PHY layer 108 may receive a request to enter the sleep state 208 and in response, the PHY layer transitions 214 to the sleep request state 206. The PHY layer 108 may receive a certain request, for example via the MII, one or more bits set in a register, and/or one or more hardware pins are asserted to enter the sleep state 208. In the sleep request state 206, the PHY layer can send and receive data, and the sleep request timer 122 may be started. If the sleep request timer 122 expires without any data being received on the physical medium, the PHY 108 transitions 216 to the sleep state 208. In the sleep state 208, and as explained below, power consumption by the PHY may be reduced as compared to the standby state 204. If, during the sleep request state 206, frames are received on the physical medium or frames are received for transmission on the physical medium, the PHY transitions 218 to the normal state 202. In some cases, such as if a sleep state 208 is disabled, the PHY may transition 220 from the sleep request state 206 to the standby state 204.

In the sleep state 208, the PHY may not be able to establish a communications link and/or transmit and receive data. Portions of the PHY, such as the control/configuration registers, power state machine, etc., may be disabled in the sleep state 208. For example, the PHY may disable (e.g., power down, clock gate, etc.) all portions of the PHY except for the energy detection circuit 112. The energy detection circuit 112 may detect a voltage over a certain threshold on one or more hardware pins to receive a wake-up and/or reset signal. Once such a signal is received, the PHY may transition 222, for example, from the sleep state 208 to the standby state 204.

In some cases, while the PHY 108 is in the standby state 204 and/or sleep request state 206, the PHY may store configuration information for the PHY. A PHY may include multiple registers and/or memories which store configuration information which may be used to configure the behavior of the PHY. The configuration information may be in the form of one or more parameters. For example, the PHY may determine, for example, during a configuration step during startup of the PHY, various parameters for media independent interfaces (MII), media dependent interface (MDI) communication speed, MDI polarity, auto negation, transmission amplitude, mode of operation, signal quality information, etc. for configuring the PHY. These parameters may be determined through a variety of techniques including detecting on the transmission medium for signals and attempting to decode signals, exchanging messages with other devices via the transmission medium, cycling through a set of possible values, etc. These parameters may be stored as configuration information for use by the PHY. To help allow transitions from the standby state 204 and/or sleep state 208 to other, more active states without having to redetermine these parameters, one or more of these parameters may be stored in a non-transitory storage medium. Examples of this storage medium may include a cache, solid state memory, or other storage system configured to retain the stored parameters while the PHY 108 is in the reduced power state. As another example, a memory 118 of the PHY 108 may store the parameters as part of the process of the PHY entering the reduced power state. In some cases, these stored parameters may be restored when the PHY transitions out of the sleep state 208. For example, the PHY may restore stored parameters, for example from the memory 118, when exiting the sleep state 208 for the standby state 204 or when exiting the standby state 204 for the normal state 202. In some cases, the stored parameters may be restored as a part of restoring the PHY when exiting the reduced power state.

In some cases, the stored configuration information may become corrupted, such as via ESD, radiation induced errors, soft errors (SER), bit flips, etc. For example, a configuration setting may include two bits where the value of the bits represents the configuration to be used. An ESD event may cause one of the bits to be flipped, for example, changing a "10" to a "11." This configuration value with a flipped bit may then undesirably be used to configure the PHY 108 when the stored configuration information is restored. In such cases, depending on the incorrect restored value, restoring the PHY based on the corrupted configuration settings may cause errors, connection issues, etc. as the configuration setting that is corrupted will not be properly applied.

In some cases, resetting the PHY may cause the PHY to correctly redetermine the parameters. However, resetting the PHY can be time consuming and cause the device coupled to the PHY to be unavailable during the reset process. Additionally, some PHYs may be used in systems which require relatively high reliability, such as autonomous vehicles, safety systems, mission critical systems, etc., and it is desirable to avoid delays and unavailability in such systems. Additionally, in some cases, resetting the PHY may require a system reset. However, systems which require relatively high reliability may be subject to long periods of time between restarting/power cycling/rebooting, and may also have relatively longer boot-up times. For example, pressing a stop button on a car may turn off an engine or disable a motor but may just place the electronics into a reduced power sleep or standby mode. A full reboot or power cycle may not be performed unless an update is applied, battery power removed, and/or during servicing. The disclosed embodiments address these issues. In accordance with aspects of the present disclosure, error correction and/or detection codes may be applied to stored configuration to detect and/or correct errors that may occur when entering, into, and/or exiting from, a reduced power state.

Figure 3:
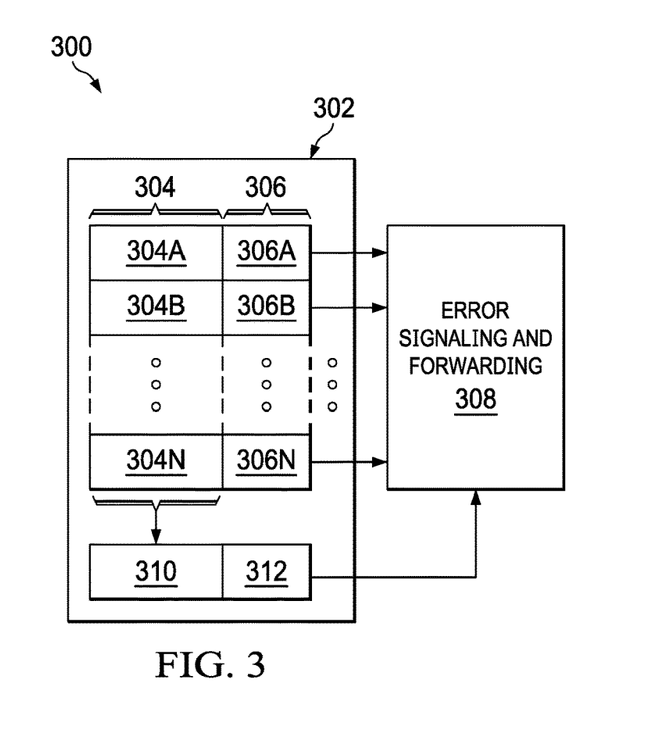
FIG. 3 is a block diagram illustrating error detection/correction for restoring PHY configuration information, in accordance with aspects of the present disclosure.

FIG. 3 is a block diagram of a PHY 300 illustrating error detection/correction for restoring PHY configuration information, in accordance with aspects of the present disclosure. The PHY 108 in FIG. 1 may be implemented using the PHY 300 of FIG. 3. As shown, PHY 300 includes a memory 302 with a set of memory data rows 304A, 304B . . . 304N (collectively memory data rows 304) where configuration parameters of the PHY 300 are stored. The memory rows 304 may be implemented, for example, using registers, static random-access memory, etc. In one example, the memory data rows 304 may all be of the same size (e.g., 8-bits, 16-bits, etc.). In other examples, the size of the rows of memory may vary among the rows of the set. The memory data rows 304 may include one or more bits for storing redundancy information that may be used to detect and/or correct errors. For example, registers having configuration information that is stored when the PHY 300 is in a reduced power state may include one or more parity bits 306A, 306B . . . 306N (collectively, parity bits 306). These parity bits 306 represent whether there is an even (or odd) number of ones (or zeros) in a value of a row of memory. For example, a memory row's parity bit may be calculated, for example by the error signaling and forwarding module 308, by exclusive-ORing (XORing) the bit values in the respective memory data row 304. The error signaling and forwarding module 308 may correspond to the error signaling and forwarding module 130 of FIG. 1.

The parity bits 306 may be calculated, for example by the error signaling and forwarding module 308, after the configuration information is determined and before the PHY 300 enters the reduced power state. For example, the parity bits 306 may be calculated as a part of entering the reduced power state, or the parity bits 306 may be calculated after the configuration information is determined and stored into the memory data rows 304.

With reference to memory data row 304A (the following description applies to other or all of the memory data rows 304), the parity bits 306 are stored along with the bit values of the memory data row 304A while the PHY 300 is in the reduced power state. For example, while the PHY 300 is not in the reduced power state, configuration information written into configuration registers, such as configuration registers 110, may be copied (e.g., stored) into corresponding portions of the memory 302, such as a corresponding memory data row 304 and parity bits calculated and stored. The configuration information and parity bits may be stored as a part of entering the reduced power state, as a part of receiving configuration information, or at any point before actually entering the reduced power state. The memory 302 may remain sufficiently powered in the reduced power state to store the configuration information and parity bits. The configuration information and parity bits may be retained in the memory 302 while the PHY 300 is in the reduced power state. When the PHY 300 exits the reduced power state, the bit values of the memory data row 304A and the parity bit 306A are restored by, for example, the error signaling and forwarding module 308. A parity calculation may be performed on the restored bit values of the memory data row 304A and compared to the corresponding parity bit 306A. If a result of the parity calculation for the restored bit values of the memory data row 304A does not match the parity bit 306A, then a single bit error has been detected.

In some cases, parity bits 306 may be used for registers having relatively small values, such as 8-bit or 16-bit values. Parity bits can be determined very quickly to detect an odd number of bit errors, but may not be effective for detection of an even number of bit errors. However, registers having relatively small values are generally much less likely to have 2-bit, or more, errors as compared to 1-bit errors due to their relatively small sizes.

In some cases, a PHY (e.g., PHY 108 or PHY 300) may include larger parameters (e.g., parameters comprising more than 16-bits), or multiple smaller parameters (collectively stored in a register 310, for example, as a larger bitfield). As a number of data bits increase, the likelihood of multibit errors, and hence an even number of errors, increases. In such cases, a multibit checksum 312 may be used for error detection instead of or in conjunction with parity bits. For example, a checksum may be determined using cyclic redundancy checks (CRC), Adler-32 algorithm, sum complement, etc.

In some examples, responsive to an error being detected, the error signaling and forwarding module 308 takes one or more actions. For example, the error signaling and forwarding module 308 may trigger an interrupt to a higher-level controller, such as the controller 104 of FIG. 1. In some cases, the error signaling and forwarding module 308 may be configured to signal that an error has occurred to other components such as a MDIO circuit, microcontroller, processor, etc. The higher-level controller may be configured to then handle the interrupt. For example, the higher-level controller may trigger a redetermination of the parameters stored in the restored memory data row 304 in which the error was detected. As another example, the higher-level controller may be configured to reset the PHY independent of the rest of the system in response to the detected error. In some cases, the error signaling and forwarding module 308 may be configured to directly reset the PHY layer 300.

In some cases, an error correction code (ECC) may be used instead of a parity bit 306 or checksum 312. An ECC encodes redundancy information into one or more extra bits that may be stored with the parameter values. The ECC code may be implemented, for example, by ECC circuitry incorporated into the memory 302 and/or the error signaling and forwarding module 308. This redundancy information may be used to detect, and in some cases, correct bit flip errors on the restored parameter values. In some cases, the ECC may be configured to detect two or more bit errors and correct single-bit errors. As a size of a register is known, a block code type ECC code may be used to help balance performance and complexity. Examples of ECC block codes include multidimensional parity, Reed-Solomon, Golay, Bose Chaudhuri Hocquenghem (BCH) codes, Hsiao codes, Hamming codes, interleaved codes, etc. As an example, a Hamming code may be applied to correct a defined number of bit failures for a set of data (e.g., 64-bits) so that a Hamming distance of 2 for 8-bit/64-bit data is used to allow the Hamming code to detect 2-bit errors and correct 1-bit errors in the set of data.

If a memory error is detected using ECC, and the ECC code can detect, but not correct, the error, the error may be reported to the error signaling and forwarding module 308. As discussed above, the error signaling and forwarding module 308 may take actions to indicate that an error has been detected, such as triggering an interrupt, resetting the PHY, etc. In some cases, responsive to a memory error being detected (e.g., in memory 118), the error may be corrected by the ECC circuitry, thereby permitting PHY operations to proceed as if the error had not occurred in the first place. In some cases, the presence of the error may be reported to, for example by the memory 302, the error signaling and forwarding module 308. The error signaling and forwarding module 308 may, for example, record that the error has occurred in a log or by incrementing a counter. In some cases, the recorded error log/counter may be sent by the error signaling and forwarding module 308 to a higher-level controller, for example via the MDIO circuit. The recorded information may be used to track error rates, for example, to help detect potential hardware degradation or failures.

Figure 4:
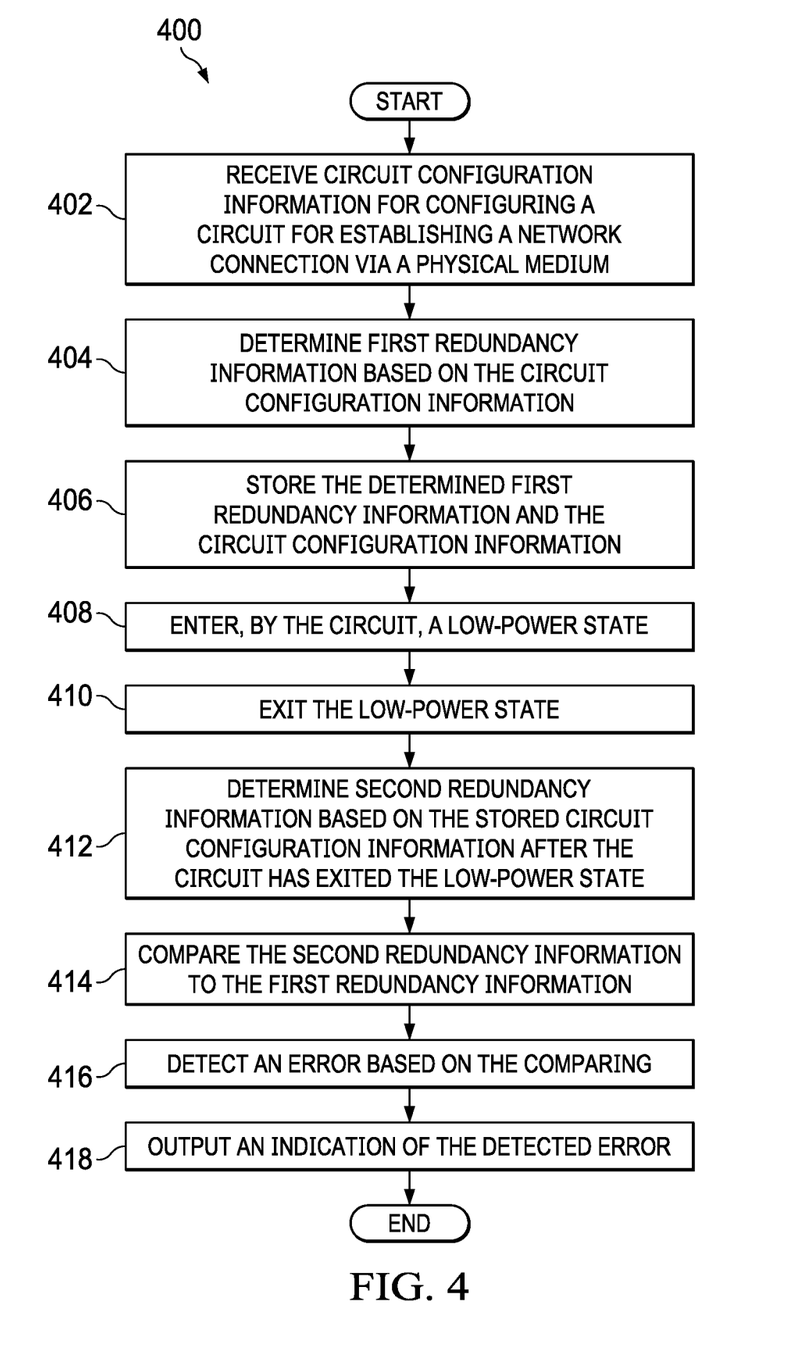
FIG. 4 is a flow diagram illustrating a technique for detecting an error after exiting a low-power state, in accordance with aspects of the present disclosure.

FIG. 4 is a flow diagram 400 illustrating a technique for detecting an error after exiting a low-power state, in accordance with aspects of the present disclosure. At block 402, circuit configuration information for configuring a circuit (e.g., a PHY) for establishing a network connection via a physical medium is received. For example, a circuit implementing an ethernet PHY layer may determine one or more operating parameters for establishing the network connection. These parameters may include parameters for media independent interfaces (MII), media dependent interface (MDI) communication speed, MDI polarity, auto negation, transmission amplitude, mode of operation, signal quality information, etc. These parameters may be received and stored by one or more registers of the circuit. For example, the parameters may be stored in configuration registers of a circuit implementing a PHY layer. At block 404, first redundancy information based on the circuit configuration information is determined. For example, a memory, such as memory 118 and 302, and/or an error signaling and forwarding module, such as error signaling and forwarding module 130 and 308, may calculate one or more redundancy bits for one or more operating parameters. In some cases, these redundancy bits may be a parity bit. In other cases, the redundancy bits may be a checksum, and in yet other cases, the redundancy bits may be determined based on an ECC algorithm. At block 406, the determined first redundancy information and the circuit configuration information are stored. For example, the one or more parameter values may be stored with their corresponding redundancy bits in the memory. At block 408, the circuit may enter a low-power state. For example, the circuit may enter a sleep or standby state, for example, in response to a signal from a microcontroller, such as controller 104. In some cases, the memory may be configured to maintain the stored values during the low-power state.

At block 410, the circuit exits the low-power state. For example, the PHY layer may receive a wake-up signal from a microcontroller (e.g., controller 104), such as via a wake-up pin, or the PHY layer may receive a wake-up ethernet packet. At block 412, the second redundancy information is determined based on the stored circuit configuration information after the circuit has exited the low-power state. For example, after the PHY layer receives a wake-up signal and exits the sleep/standby state, redundancy bits may be calculated based on the one or more parameter values by the memory, such as memory 118 and 302, and/or the error signaling and forwarding module, such as error signaling and forwarding module 130 and 308. At block 414, the second redundancy information is compared to the first redundancy information. For example, the redundancy bits calculated on the one or more parameter values after the PHY layer exists the sleep/standby state may be compared to the stored redundancy bits stored in the memory, such as memory 118 and 302. At block 416, an error may be detected based on the comparison. For example, if the redundancy bits calculated after the PHY layer exits the sleep/standby state does not match the stored redundancy bits, an error may be detected. In cases where an ECC algorithm is used, the error may be corrected, if possible. For example, the ECC algorithm, implemented in ECC circuitry in a memory, such as memory 118 and 302, and/or an error signaling and forwarding module, such as error signaling and forwarding module 130 and 308, may be able to detect 2-bit errors and correct 1-bit errors, and thus 1-bit errors may be corrected and 2-bit errors detected. At block 418, an indication of the detected error is output. For example, error detection circuitry in a memory (such as memory 118 and 302) and/or an error signaling and forwarding module (such as error signaling and forwarding module 130 and 308) may output an indication of the detected error to an error signaling module. In some cases, the error signaling module may take corrective responses, such as rebooting the PHY layer or attempting to reinitialize affected parameters. Where an ECC algorithm is used to correct the error, an indication of the error may be output, for example, to monitor and/or track the occurrence of errors. In some cases, the error signaling module may output an indication of the error to a higher-level module, for example, by setting an interrupt.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party. Furthermore, components described above as hardware components may, instead, be implemented using software operating on a microcomputer, microcontroller, processor and/or digital circuitry, and components described above as software components may be implemented using digital circuitry, analog circuitry, state machine, application specific integrated circuit and/or a processor.

Unless otherwise stated, "about," "approximately," or "substantially" preceding a value means+/−10 percent of the stated value. Modifications are possible in the described embodiments, and other embodiments are possible within the scope of the claims.

What is claimed is:
1. A circuit comprising:
a controller; and
a physical layer (PHY) comprising:
    registers coupled to the controller, the controller configured to store rows of circuit configuration information in the registers;

a memory coupled to the registers; and
error circuitry coupled to the memory, the error circuitry configured to:
responsive to determining that the circuit is entering a reduced power state:
retrieve the rows of the circuit configuration information from the registers;
determine first bits based on the rows of the circuit configuration information, a bit of the first bits corresponding to each of the rows of the circuit configuration information; and
store the rows of the circuit configuration information and the corresponding first bits in the memory; and
responsive to determining that the circuit is exiting the reduced power state:
retrieve the rows of the circuit configuration information and the first bits from the memory to produce retrieved rows of the circuit configuration information and retrieved first bits;
determine second bits based on the retrieved rows of the circuit configuration information, a bit of the second bits corresponding to each of the retrieved rows of the circuit configuration information;
compare the second bits to the retrieved first bits; and
responsive to determining that the second bits do not match the retrieved first bits, output an indication of a detected error.

2. The circuit of claim 1, wherein the first bits comprise parity bits.

3. The circuit of claim 1, wherein the first bits comprise checksums.

4. The circuit of claim 1, wherein the error circuitry is further configured to determine the first bits based on an error correcting code.

5. The circuit of claim 4, wherein the error circuitry is further configured to correct the detected error.

6. The circuit of claim 1, wherein the error circuitry is configured to:
receive the indication of the detected error; and
responsive to receiving the indication of the detected error, trigger an interrupt via a media dependent interface.

7. The circuit of claim 6, wherein the error circuitry is further configured to trigger a reset of the circuit.

8. The circuit of claim 1, wherein the circuit is configured to establish a network connection via an ethernet connection.

9. A method comprising:
storing, by a controller, rows of circuit configuration information in registers in a physical (PHY) layer;
responsive to determining, by an error circuit in the PHY layer, that a circuit comprising the controller and the PHY layer is entering a reduced power mode:
retrieving the rows of the circuit configuration information from the registers;
determining first bits based on the rows of the circuit configuration information, a bit of the first bits corresponding to each of the rows of the circuit configuration information; and
storing the rows of the circuit configuration information and the corresponding first bits in memory in the PHY layer; and
responsive to determining, by the error circuit, that the circuit is exiting the reduced power mode:
retrieving the rows of the circuit configuration information and the first bits from the memory to produce retrieved circuit configuration information and retrieved first bits;
determining second bits based on the retrieved rows of the circuit configuration information, a bit of the second bits corresponding to each of the retrieved rows of the circuit configuration information;
comparing the second bits to the retrieved first bits; and
responsive to determining that the second bits do not match the retrieved first bits, outputting an indication of a detected error.

10. The method of claim 9, wherein the first bits comprise parity bits.

11. The method of claim 9, wherein the first bits comprise checksums.

12. The method of claim 9, wherein the first bits comprise an output of an error correcting code.

13. The method of claim 12, further comprising correcting the detected error.

14. The method of claim 9, further comprising:
receiving the indication of the detected error; and
forwarding the error by triggering an interrupt via a media dependent interface.

15. The method of claim 14, further comprising triggering a reset of the circuit.

16. The method of claim 9, wherein the circuit is configured to establish a network connection via an ethernet connection.

17. A device comprising:
registers configured to store rows of circuit configuration information;
a memory coupled to the registers; and
error circuitry coupled to the memory, the error circuitry configured to:
responsive to determining that the device is entering a reduced power state:
retrieve the rows of the circuit configuration information from the registers;
determine first bits based on the rows of the circuit configuration information, a bit of the first bits corresponding to each of the rows of the circuit configuration information; and
store the rows of the circuit configuration information and the corresponding first bits in the memory; and
responsive to determining that the device is exiting the reduced power state:
retrieve the rows of the circuit configuration information and the first bits from the memory to produce retrieved circuit configuration information and retrieved first bits;
determine second bits based on the retrieved rows of the circuit configuration information, a bit of the second bits corresponding to each of the retrieved rows of the circuit configuration information;
compare the second bits to the retrieved first bits; and
responsive to determining that the second bits do not match the retrieved first bits, output an indication of a detected error.

18. The device of claim 17, wherein the first bits comprise parity bits.

19. The device of claim 17, wherein the first bits comprise checksums.

20. The device of claim 17, wherein the error circuitry is further configured to determine the first bits based on an error correcting code.

* * * * *